(12) United States Patent
Shi et al.

(10) Patent No.: US 9,746,654 B2
(45) Date of Patent: Aug. 29, 2017

(54) OPTICAL DELAY ELEMENTS CREATED FROM VARIATIONS OF THE ROBERT CELL

(71) Applicant: OHIO STATE INNOVATION FOUNDATION, Columbus, OH (US)

(72) Inventors: Yu Shi, Stanford, CA (US); Betty Lise Anderson, Gahanna, OH (US)

(73) Assignee: OHIO STATE INNOVATION FOUNDATION, Columbus, OH (US)

(*) Notice: Subject to any disclaimer, the term of this patent is extended or adjusted under 35 U.S.C. 154(b) by 362 days.

(21) Appl. No.: 14/269,857

(22) Filed: May 5, 2014

(65) Prior Publication Data

US 2014/0334023 A1 Nov. 13, 2014

Related U.S. Application Data

(60) Provisional application No. 61/820,897, filed on May 8, 2013.

(51) Int. Cl.
```
G02B 5/10      (2006.01)
G02B 17/00     (2006.01)
G02B 17/08     (2006.01)
G02B 17/06     (2006.01)
```

(52) U.S. Cl.
CPC ....... *G02B 17/004* (2013.01); *G02B 17/0605* (2013.01); *G02B 17/082* (2013.01)

(58) Field of Classification Search
CPC . G02B 17/0605; G02B 17/082; G02B 17/004
USPC .............................. 359/204.1, 846, 858, 867
See application file for complete search history.

(56) References Cited

U.S. PATENT DOCUMENTS

| 4,297,600 A * | 10/1981 | Trutna, Jr. ............ | H01S 3/305 204/157.22 |
| 6,266,176 B1 | 7/2001 | Anderson et al. | |
| 7,187,820 B1 * | 3/2007 | Stone .................. | G02B 17/004 359/15 |
| 2007/0009207 A1 * | 1/2007 | Xu ...................... | G02B 6/2861 385/39 |

(Continued)

OTHER PUBLICATIONS

Anderson, et al., "Binary Optical True-Time Delay Based on the White Cell: Design and Demonstration," Journal of Lightwave Technology, vol. 24, No. 4, pp. 1886-1895 (Apr. 2006).

(Continued)

*Primary Examiner* — Scott J Sugarman
*Assistant Examiner* — Daniele Manikeu
(74) *Attorney, Agent, or Firm* — Fay Sharpe LLP

(57) ABSTRACT

An optical delay device comprises a multi-pass optical cell including first and second facing curved mirrors defining an optical cavity. One curved mirror includes a spatially extended aperture, such as a wedge-shaped notch aperture formed into the perimeter of the curved mirror. One curved mirror is split into two component mirrors one of which is tilted to define a swirling reflection pattern on the curved mirror that includes the spatially extended aperture. The optical time delay introduced to a light ray by the multi-pass optical cell depends on the input location of the light ray into the spatially extended aperture. The optical delay device may include two such multi-pass optical cells and a mirror that optically couples the two said multi-pass optical cells.

20 Claims, 6 Drawing Sheets

(56) References Cited

U.S. PATENT DOCUMENTS

| | | | | |
|---|---|---|---|---|
| 2008/0304125 A1* | 12/2008 | Hsu | ................... | G02B 17/004 |
| | | | | 359/223.1 |
| 2012/0092782 A1* | 4/2012 | So | ................... | G02B 17/004 |
| | | | | 359/858 |
| 2015/0022799 A1* | 1/2015 | Mann | ................ | G02B 17/0657 |
| | | | | 355/71 |

OTHER PUBLICATIONS

Kunathikom, et al., "Design of delay elements in a binary optical true-time-delay device that uses a White cell," Allied Optics, vol. 42, No. 35, pp. 6984-6994 (Dec. 2003).

Robert, "Simple stable and compact multiple-reflection optical cell for very long optical paths," Allied Optics, vol. 46, No. 22, pp. 5408-5418 (Aug. 2007).

Shi, et al., "Robert Cell-Based Optical Delay Elements for White Cell True-Time Delay Devices," Journal of Lightwave Technology, vol. 31, No. 7, pp. 1006-1014 (Apr. 2013).

* cited by examiner

OPTICAL DELAY ELEMENTS CREATED FROM VARIATIONS OF THE ROBERT CELL

This application claims the benefit of U.S. Provisional Application No. 61/820,897 filed May 8, 2013 titled "Optical Delay Elements Created from Variations of the Robert Cell". U.S. Provisional Application No. 61/820,897 filed May 8, 2013 titled "Optical Delay Elements Created from Variations of the Robert Cell" is incorporated by reference herein in its entirety.

BACKGROUND

The following relates to the optical arts, optical delay element arts, and related arts, and to applications of aforesaid such as phased array antennae, optical buffering, and the like.

Phased-array antennas find application in a wide range of systems that rely on the emission and reception of electromagnetic waves. Such systems include surveillance, tracking, astronomy, and geodesy to wireless and satellite communication. Phased-array antennas are made up of a series of independent, small-element antennas that can be programmed to jointly produce a concentrated beam of electromagnetic ray propagating at a certain direction. See, e.g. Anderson et al., "Binary Optical True Time Delay Based on the White Cell: Design and Demonstration, *IEEE Journal of Lightwave Technology*," IEEE Journal of Lightwave Technology, vo. 24 no. 4, pp. 1886-95, April, 2006.

To control the emission and reception directions of the phased-array antenna, each antenna element's emission (or received signal) is phase-shifted or time-delayed by a precise amount to produce a directional propagation (or reception). For narrowband waves, phase-shifting suffices, as it treats a phase shift of $4\pi$ as equivalent to 0 radians, which is valid for a narrow range of frequencies. For broadband systems, true-time delay (TTD) is suitably used, in which a time delay that amounts to $4\pi$ at one frequency might be $3.5\pi$ at another. True-time delays prevent beam squinting, in which different frequencies travel in different directions. Examples of existing optical TTD systems include those based on the White cell. See, e.g. Anderson et al., U.S. Pat. No. 6,266,176 issued Jul. 24, 2001. A known design for a White cell-based TTD system includes a White cell with a micro-electro-mechanical system (MEMS) of mirrors and various optical delay devices operating around the White cell. As an array of focused beams is sent into the White cell, it will collectively reflect within the cell and form pixelated and non-overlapping spot patterns that focus on a successive MEMS element of a MEMS array after every two bounces (for the binary cell). To delay any individual ray within the beam array, for each cycle of operation (every two bounces), the appropriate pixels on the MEMS array can be tilted such that the chosen beams leave the White cell and go into an optical delay element. Over one cycle, the specified optical delay element adds delays to the selected beams with respect to the rays that circulate within the White cell, and it sends the beams back into the system for the next cycle of operation. The delay elements used in conjunction with the White cell should have certain properties. The delay elements should satisfy the imaging constraint—that is, the output beam should be an image of the input beam. The positions and slopes of the rays should have a predictable input/output relationship. Normally, it is desirable to have delay elements that act like mirrors, but this is not a necessity. Additionally, the delay elements should not produce an excessive amount of optical loss.

Various types of delay elements are known, but they have various limitations. Dielectric delay blocks are appropriate for short delays, on the order of picoseconds, but are less practical for longer delays. Delay elements based on lens trains have similar problems: the lens train can become prohibitively long and include many discrete lenses, making alignment difficult. In principle, delays up to perhaps 25 nanoseconds are practically achievable using lens trains. Heretofore, longer delays have typically been achieved using optical fiber delay elements, which also introduce alignment issues and losses.

Disclosed herein are improved delay elements capable of achieving long delays in a compact device with low losses.

BRIEF DESCRIPTION

In some illustrative embodiments disclosed as illustrative examples herein, an optical delay device comprises a multi-pass optical cell including a first curved mirror and a second curved mirror facing the first curved mirror to define an optical cavity. The second curved mirror includes a spatially extended aperture, and the multi-pass optical cell is configured to provide a selectable optical time delay based on the location of an input light beam in the spatially extended aperture. In some embodiments the spatially extended aperture comprises a wedge-shaped notch aperture formed into the perimeter of the second curved mirror. In some embodiments the first curved mirror is a spherical mirror and the second curved mirror is a spherical mirror. In some embodiments the second curved mirror is split to define two component mirrors, one of the two component mirrors is tilted about a tilt axis, and the wedge-shaped notch aperture is defined at least in part by a slanted perimeter edge that is slanted respective to the tilt axis. In some further embodiments the optical delay device includes two such multi-pass optical cells each including one or more said wedge-shaped notch apertures, and further includes a coupling mirror that optically couples the two said multi-pass optical cells via their respective wedge-shaped notch apertures. In some embodiments the coupling mirror is a spherical mirror.

In some illustrative embodiments disclosed as illustrative examples herein, an optical delay method comprises: inputting a light ray into a wedge-shaped notch aperture formed into the perimeter of a second curved mirror of a multi-pass optical cell comprising first and second curved mirrors facing each other to define an optical cavity; and receiving said light ray from a wedge-shaped notch aperture formed into the perimeter of the second curved mirror of the multi-pass optical cell. In some embodiments the light ray is received from the same wedge-shaped notch aperture formed into the perimeter of the second curved mirror into which the light ray was inputted. In other embodiments the light ray is input into an input wedge-shaped notch aperture and the light ray is received from an output wedge-shaped notch aperture formed into the perimeter of a side of the second curved mirror opposite from the input wedge-shaped notch aperture. In some embodiments the multi-pass optical cell is configured to generate a swirling pattern of reflections on the second curved mirror, and the optical delay method further comprises selecting a desired optical time delay, wherein the inputting comprises inputting the light ray into an input location in the wedge-shaped notch aperture that is effective to provide the selected optical time delay between the inputting and the receiving.

In some illustrative embodiments disclosed as illustrative examples herein, an optical delay device comprises a multi-pass optical cell including a first curved mirror and a second curved mirror facing the first curved mirror to define an optical cavity. One curved mirror of the multi-pass optical cell includes a spatially extended aperture. One curved mirror of the multi-pass optical cell is split into two component mirrors one of which is tilted to define a swirling reflection pattern on the curved mirror that includes the spatially extended aperture for a light ray input into the spatially extended aperture, and an optical time delay introduced to the light ray by the multi-pass optical cell depends upon the input location of the light ray into the spatially extended aperture. In some embodiments the spatially extended aperture comprises a wedge-shaped notch aperture formed into the perimeter of the curved mirror that includes the spatially extended aperture. In some embodiments, the wedge-shaped notch aperture is defined in part by a slanted perimeter edge that is slanted respective to a tilt axis of the component mirror that is tilted, and the optical time delay introduced to a light ray by the multi-pass optical cell depends on where along the slanted perimeter edge the light ray is input into the wedge-shaped notch aperture. In some embodiments the same curved mirror of the multi-pass optical cell both includes the wedge-shaped notch aperture and the split into two component mirrors one of which is tilted. In some embodiments the first and second curved mirrors are first and second spherical mirrors. In some embodiments the optical delay device includes two such multi-pass optical cells and further includes a curved mirror that optically couples the two said multi-pass optical cells.

BRIEF DESCRIPTION OF THE DRAWINGS

Unless otherwise noted, the drawings are not to scale or proportion. The drawings are provided only for purposes of illustrating preferred embodiments and are not to be construed as limiting.

DETAILED DESCRIPTION OF PREFERRED EMBODIMENTS

Disclosed herein are embodiments of optical delay elements comprising a system of mirrors that relies on multiple reflections between a small number of mirrors to attain time delays. The disclosed delay elements are based on a multi-pass multi-mirror optical cell referred to herein as a Robert cell. See, e.g. Robert, "Simple, stable, and compact multiple-reflection optical cell for very long optical paths," Applied Optics, vol. 46 no. 22 pages 5408-18, August 2007. Although the Robert cell was initially created for spectroscopy uses, it can also produce a large time delay because of the large number of ray reflections that happen within the system. The Robert cell is the most general of three related multi-pass multi-mirror optical cells discussed here. The other two illustrative multi-mirror optical cells include the White cell and the Herriott cell, both of which can be considered as special cases of the Robert cell.

Figure 1:
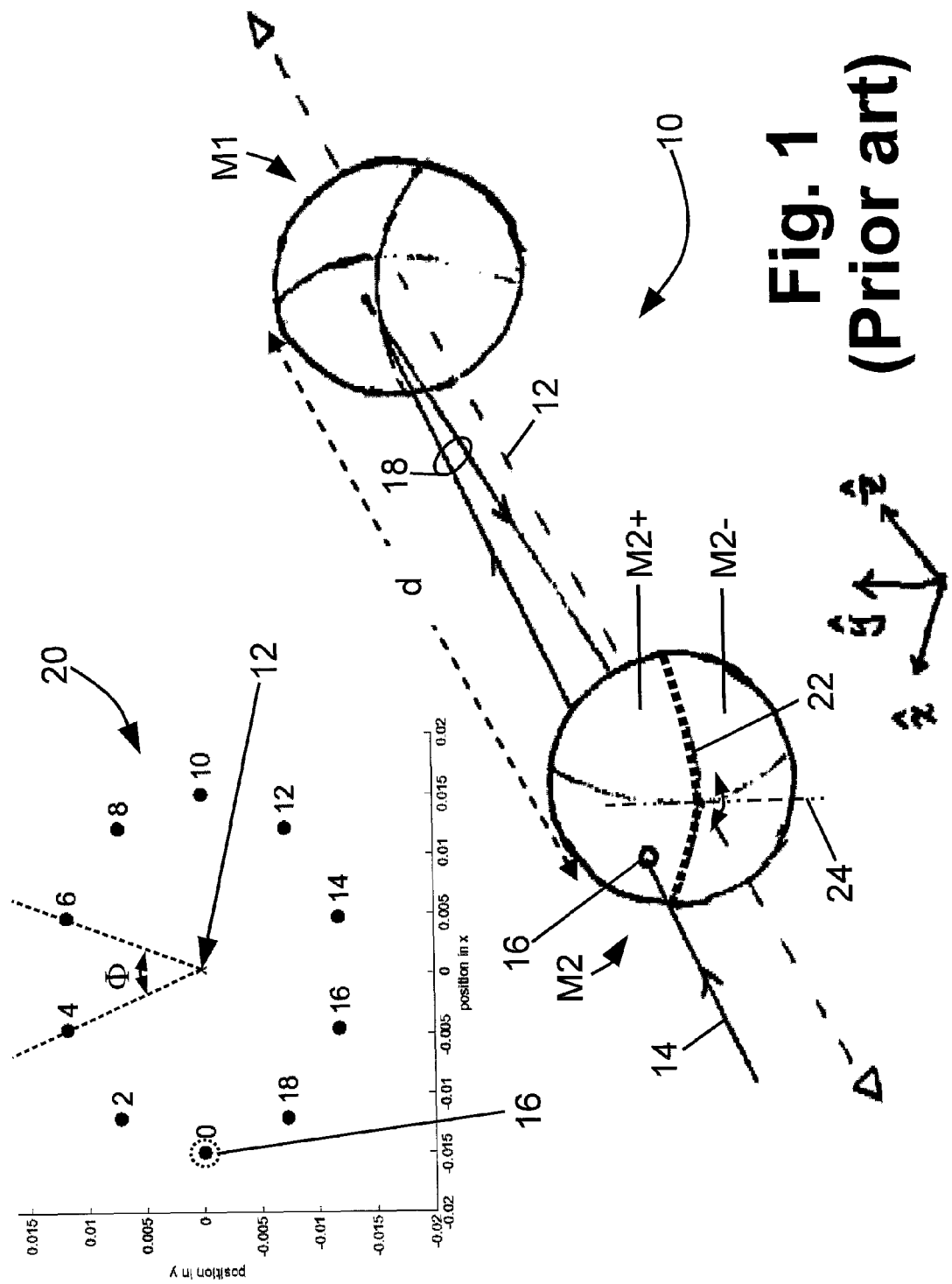
FIG. 1 shows a diagrammatic perspective view of a multi-pass optical cell of the Herriott cell type or, with the split of the mirror M2, of the Robert cell type. The upper left inset shows a Herriott cell reflection pattern with cell specifications as described in the text.

With reference to FIG. 1, an illustrative multi-pass optical cell 10 having the configuration of a Herriott cell is described. The illustrative Herriott cell includes two spherical mirrors M1, M2 oriented facing each other with a common optical axis 12. As shown in FIG. 1, a light beam 14 enters the Herriott cell via an input beam aperture 16 formed into one mirror (namely mirror M2 in illustrative FIG. 1) and makes multiple passes which are diagrammatically indicated by arrows 18 (where only two passes are shown, but in general the number of passes may be larger, or much larger). It has been shown using computer simulation, mathematical derivation, and experimental analysis that the spot patterns within a Herriott cell (see illustrative spot pattern 20 shown in FIG. 1) are elliptical, and the angle $\phi=2\alpha$ between two consecutive reflections can be described by (see Robert, supra):

$$\cos(\alpha) = \sqrt{\left(1 - \frac{d}{R_1}\right)\left(1 - \frac{d}{R_2}\right)} \qquad (1)$$

where $R_1$ and $R_2$ are the radii of curvatures of the first and second spherical mirrors M1, M2, respectively, and d is the separation between the two mirrors M1, M2 as indicated in FIG. 1. By setting $\phi=360°/K$, where K is an integer, a periodic reflection pattern can be achieved with periodicity K within the Herriott cell. (Note that this means the beam entrance aperture 16 also suitably serves as the beam exit aperture). The illustrative spot pattern 20 shown in FIG. 1 illustrates an example of a Herriott cell reflection pattern on mirror M2 with a periodicity of K=10. That is, there are 10 spots (numbered with even numbers for mirror M2; odd-numbered spots appear on the mirror M1 at the other end of the Herriott cell of FIG. 1). For the illustrative Herriott cell reflection pattern 20 of FIG. 1, the following computer simulation parameters were used: $R_1$=0.401, $R_2$=∞ (infinity), and d=0.0401, for which Equation (1) yields $\phi=2\alpha=36°$.

With continuing reference to FIG. 1, a Robert cell is similar to the Herriott cell, but differs as follows: in a Robert cell, one mirror (namely mirror M2 having the beam input aperture 12 in the illustrative Herriot cell) is split horizontally along a split axis 22 into two equal pieces (i.e. mirrors), denoted M2− and M2+ in the multi-pass optical cell 10 of FIG. 1. One of these mirrors (namely the top mirror M2+ in illustrative FIG. 1) is fixed, while other mirror (namely the lower mirror M2− in illustrative FIG. 1) is allowed to tilt with respect to a vertical axis 24. In the following, a Cartesian coordinate (x-y-z) system indicated in FIG. 1 is employed in describing orientations of the multi-pass optical cell 10 of FIG. 1, with the horizontal axis 22 being parallel with the x-axis and the vertical axis 24 being parallel with the y-axis; however, it will be appreciated that other coordinate systems may be designated, and that the split of the mirror M2 may be along a vertical or other axis instead of along the illustrative horizontal axis 22. Similarly, it is contemplated to split mirror M1 instead of mirror M2 to obtain a Robert cell configuration.

In sum, with mirror M2 split into component mirrors M2+, M2− with one mirror M2− being tilted, the multi-pass optical cell 10 of FIG. 1 is converted to a Robert cell. The Herriott cell can be considered a special case of the Robert cell in which the mirror M2− is not tilted but rather has a fixed orientation that, together with the mirror M2+, defines a single unitary spherical mirror M2. In the case of a Robert cell, the component mirror M2− is tilted at an angle denoted herein by tilt angle θ. For ease of notation, a zero degree tilt (θ=0°) of the mirror M2− designates the position of the mirror M2− for which it, together with the fixed mirror M2+, defines a spherical mirror. It should be noted that the non-zero tilt of the component mirror M2− in the Robert cell is not necessarily an adjustable tilt—for example, the component mirror M2− may have a fixed non-zero tilt with respect to the fixed non-tilted mirror M2+. On the other hand, if the tilt angle θ of the component mirror M2− is adjustable, then this provides enhanced configuration flexibility.

Figure 2:
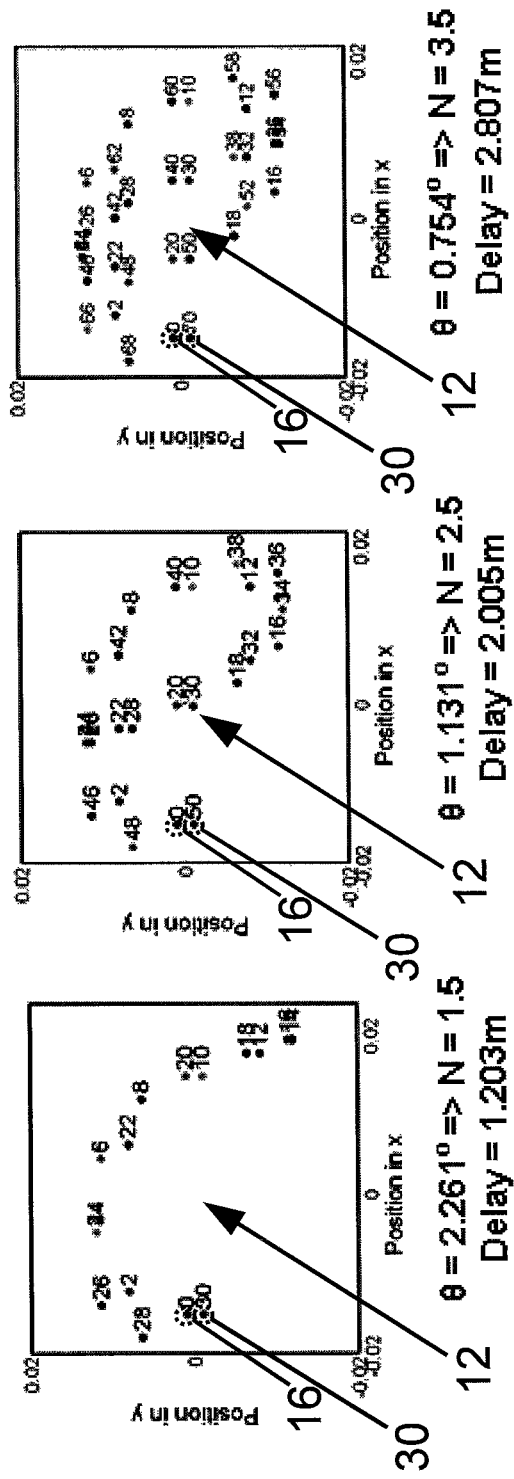
FIG. 2 plots three illustrative cell reflection patterns for a Robert cell with cell specifications as described in the text.

With continuing reference to FIG. 1 and with further reference to FIG. 2, as an extension of the Herriott cell, the Robert cell inherits the periodicity property on its y-axis (using the Cartesian coordinate system indicated in FIG. 1). However, due to the tilt of the lower spherical mirror M2−, the reflection patterns (for tilt angles other than 0°) exhibit a "swirling" tendency (see FIG. 2) because the elliptical pattern changes on the x-axis when the beam impinges on the tilted mirror M2−. It is then appropriate to define every K cycle of reflections as one "swirl." Multiple swirls are denoted herein as N swirls, where N is an integer. Mathematically, it can be derived that when the tilt-mirror M2− is tilted by a small angle θ, the change in position on the x-axis for every swirl, denoted here as Δx, is directly proportional to angle θ. Sample reflection patterns are displayed in FIG. 2, and the indices next to the reflection dots designate the number of reflections that the ray has encountered. For the computer simulations shown in FIG. 2, the following parameters were used: $R_1$=0.42 m, $R_2$=∞, d=0.0401 m, and periodicity K=10. The tilt angle (θ), the number of swirls plotted (N), and the corresponding time delay are indicated below each illustrative reflection pattern shown in FIG. 2.

As seen in FIG. 2, by adjusting the tilt angle θ of the mirror M2−, different number of bounces and therefore different delays can be obtained. For example, with a small mirror separation of d=4.01 cm between the mirrors M1, M2 (where for the Robert cell the notation "mirror M2" denotes the combination of mirrors M2+, M2−), with N=3.5 and K=10, the beam travels 2.807 meters, which corresponds to a 807 m time delay of $$\frac{2.807 \text{ m}}{3.00 \times 10^8 \text{ m/s}} = 9.36 \times 10^{-9} \text{ s} = 9.36 \text{ ns}.$$

For comparison, to achieve the same delay with a lens train requires the system to be 2.8 meters long and may require many lenses, depending on the spot size and number of spots. Thus, the Robert cell shows great promise in shrinking the physical dimensions of the true-time delay system. On top of that, the amount of loss corresponding to the Robert cell can be made low by using high reflectivity mirrors. Using existing coating technologies, high-reflectivity coatings on mirrors can be made more optically efficient (that is, less loss) than anti-reflection coatings on lenses, and lenses have two surfaces instead of one thus doubling the number of loss interfaces. Moreover, a dielectric mirror can be constructed to have very high reflectivity, e.g. reflectivity of 0.999.

Input and output conditions of the Robert cell are as follows, where the following notation is used: the input beam aperture position is denoted ($x_{in}$, $y_{in}$), the input beam angle is denoted ($Sx_{in}$, $Sy_{in}$), the output beam aperture position is denoted ($x_{out}$, $y_{out}$), and the output beam angle is denoted ($Sx_{out}$, $Sy_{out}$). Two situations are considered here. In the first situation, the output is retrieved on the opposite side of the input (that is, through an exit beam aperture in mirror M1 for the illustrative multi-pass optical cell 10 of FIG. 1) with the exit aperture located on the mirror M1 so as to pass the ray after the ray circulates a full N swirls. In this case, the following relationships hold:

$$x_{out} = -x_{in} \quad (2)$$

$$y_{out} = y_{in} \quad (3)$$

$$Sx_{out} = -Sx_{in} + \gamma \quad (4)$$

$$Sy_{out} = Sy_{in} \quad (5)$$

It is seen in Equations (4) and (5) that the output slope relates to the input slope in a way that is similar to a beam striking a mirror, except the slope in the x-direction is rotated by γ. The quantity γ is an output angle offset due to the tilt of the mirror M2−, and is specified by the parameters of the Robert cell.

The second situation considered here is where the output is retrieved on the same side as the input (that is, through an exit beam aperture in the mirror M2 that also contains the input beam aperture 16), with the exit aperture located on the mirror M2 so as to pass the ray after it circulates N+½ swirls. FIG. 2 illustrates this latter case, with an exit beam aperture 30 indicated in each reflection pattern plotting the even reflections off of mirror M2. For the left reflection pattern of FIG. 2 N=1.5 and K=10 so that the beam exit aperture 30 is positioned to pass the reflection numbered N·(2K)=30. For the middle reflection pattern of FIG. 2 N=2.5 and K=10 so that the beam exit aperture 30 is positioned to pass the reflection numbered N·(2K)=50. For the right reflection pattern of FIG. 2 N=3.5 and K=10 so that the beam exit aperture 30 is positioned to pass the reflection numbered N·(2K)=70. In this second situation in which rays exit after N+½ swirls, the relationships are:

$$x_{out} = x_{in} \quad (6)$$

$$y_{out} = -y_{in} \quad (7)$$

$$Sx_{out} = Sx_{in}\gamma \quad (8)$$

$$Sy_{out} = -Sy_{in} \quad (9)$$

To practically implement a delay element into a White cell based system, the delay device should allow the input of a focused array of beams, and the output beams should also be focused. For a Robert cell system, there are three degrees of freedom with parameters $R_1$, $R_2$, and d to satisfy both the periodicity constraint and the focusing requirement. On top of that, one can specify a unit time delay increment for each swirl and adjust the distance d and solve for radii $R_1$ and $R_2$. Three equations are thus defined with these three specifications to solve for the three cell parameters $R_1$, $R_2$, and d. To verify this analysis, a MATLAB® program was written to perform these calculations, and the output cell parameters were verified to satisfy the system requirements.

The Robert cell provides numerous benefits as outlined above. However, further improvements are disclosed herein, which overcome certain limitations of the Robert cell recognized herein. One limitation of the Robert cell is that it provides a fixed delay which is not readily adjusted. Another limitation is that the time delay provided by a Robert cell, while significantly lengthened as compared with other typical optical delay elements, could beneficially be further lengthened. In the following, improved optical delay elements comprising multi-pass optical cells are described which overcome such limitations.

Figure 3:
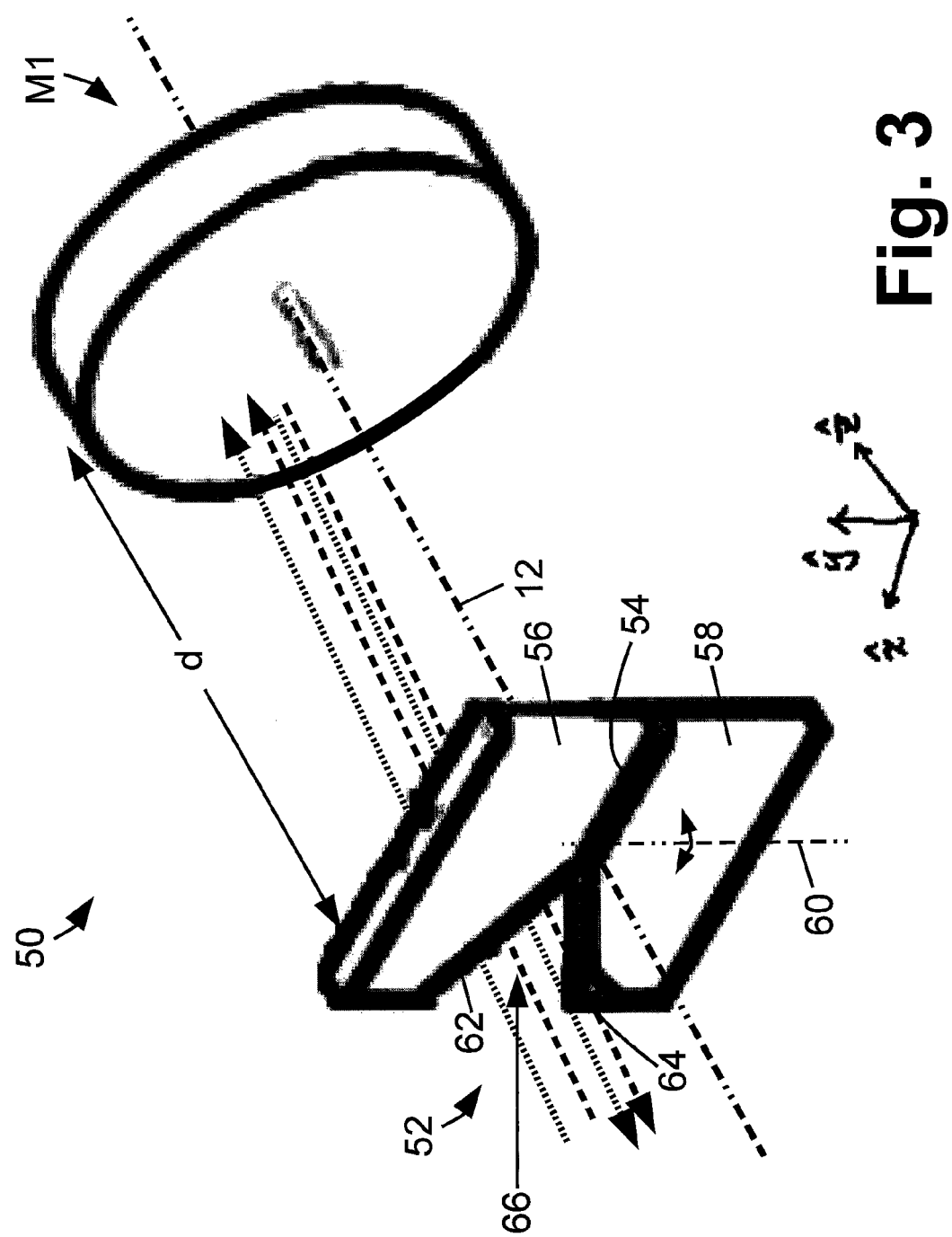
FIG. 3 shows a diagrammatic perspective view of an optical delay element comprising a multi-pass optical cell including a mirror having a wedge-shaped notch aperture.
Figure 4:
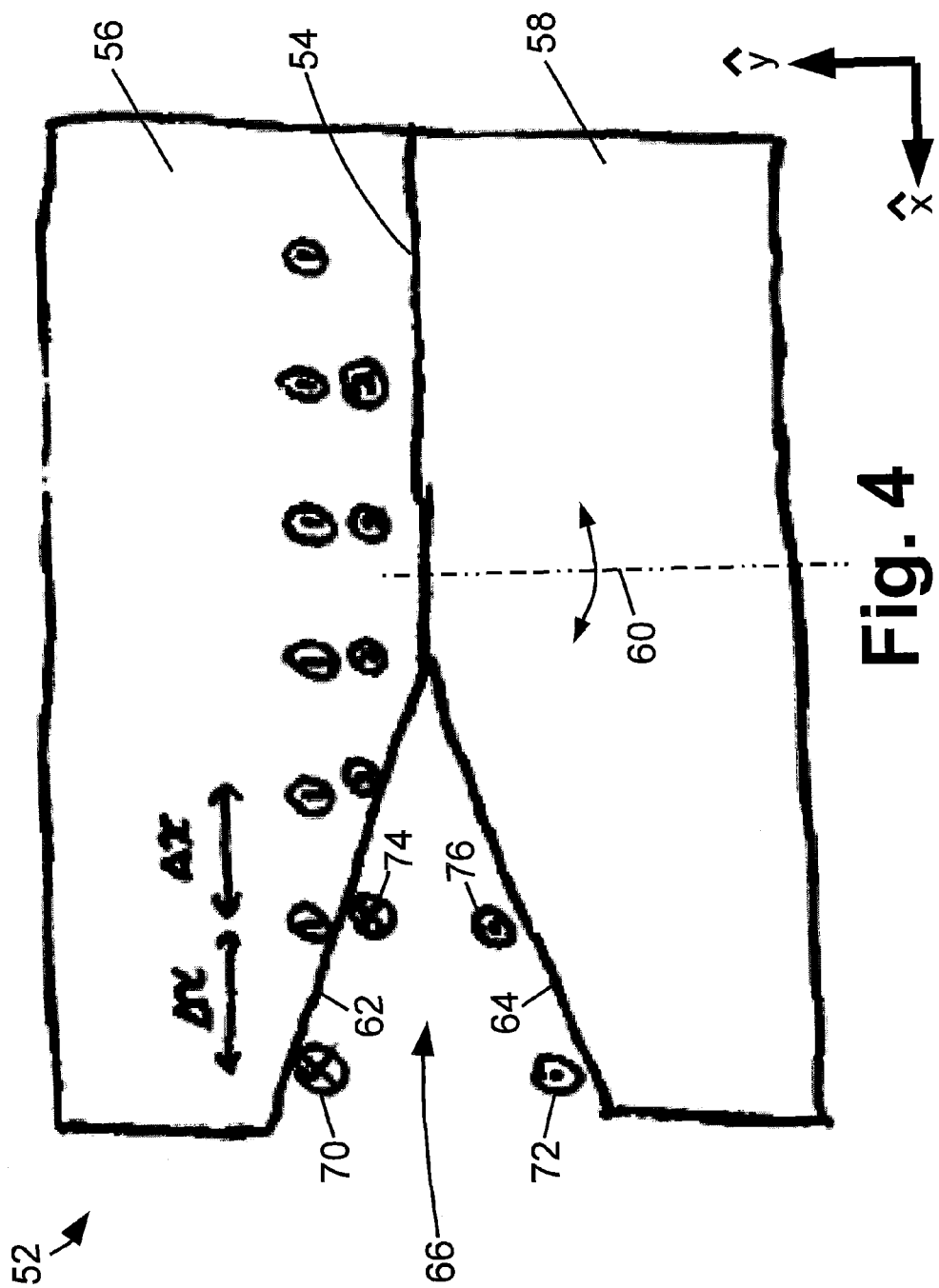
FIG. 4 shows a plan view of the mirror having a wedge-shaped notch aperture of the multi-pass optical cell of FIG. 3.

With reference to FIGS. 3 and 4, an improved delay element comprises a multi-pass optical cell 50 having the mirror M1 as described with reference to FIG. 1, and further having a second mirror 52 corresponding to the mirror M2 of the optical delay cell of FIG. 1, but having a different perimeter shape. The mirrors M1, 52 of the optical delay cell 48 are oriented facing each other along a common optical axis 12, analogously to the arrangement of the mirrors M1, M2 of the optical delay cell of FIG. 1. Similarly to the mirror M2 of the embodiment of FIG. 1, the mirror 52 of the optical cell 50 is a spherical mirror that is split horizontally along a split axis 54 into first and second component mirrors 56, 58. The first component mirror 56 is fixed, while the second component mirror 58 is allowed to tilt with respect to a vertical axis 60. The same Cartesian coordinate (x-y-z) system indicated in FIG. 1 is also employed in describing the optical delay cell 50 of FIGS. 3 and 4, with the horizontal axis 54 being parallel with the x-axis and the vertical axis 60 being parallel with the y-axis; however, it will be again appreciated that other coordinate systems may be designated.

The mirror 52 differs from the mirror M1 of the embodiment of FIG. 1 in that it has a different perimeter shape, and omits the entrance beam aperture 16 of the mirror M1. In particular, the mirror 52 has a first slanted perimeter edge 62 formed into the first component mirror 56 that is slanted respective to the mirror split axis 54 and respective to the tilt axis 60, and has a second slanted perimeter edge 64 formed into the second component mirror 58 that is again slanted respective to the mirror split axis 54 and respective to the tilt axis 60. The two slanted perimeter edges 62, 64 are slanted in opposite directions, and define a wedge-shaped notch 66 formed into the perimeter of the mirror 52. As described herein, the wedge-shaped notch 66 serves as the optical aperture for the optical delay cell 50 of the embodiment of FIGS. 3 and 4, and hence is sometimes referred to herein as wedge-shaped notch aperture 66. The shape of the mirror 52, and in particular the shape of the wedge-shaped notch aperture 66, allows light rays to enter from different positions and exit accordingly. As previously noted, for a Robert cell with a non-zero small tilt angle θ, to achieve N or N+½ swirls the position in x can be described by x=(N/2)·Δx. By sending rays through the wedge-shaped notch aperture 66 whose positions in x are multiples of Δx, one can obtain discrete increments of swirls, which manifest themselves in increasing time delays.

With particular reference to FIG. 4, the wedge-shaped notch aperture 66 is configured to operate in conjunction with reflections over N+½, so that Equations (6)-(9) apply. In this case, the exit ray passes out the same aperture 66 that receives the input ray, and at the same x position in accord with Equation (6) ($x_{out}=x_{in}$), but the exit ray is reflected across the x-axis as per Equation (7), that is, $y_{out}=-y_{in}$. FIG. 4 shows two illustrative examples. In one example, an input ray 70 passes through the wedge-shaped notch aperture 66 proximate to the first slanted perimeter edge 62, and thus having a positive $y_{in}$ coordinate. The corresponding exit ray 72 leaves at the same x-coordinate ($x_{out}=x_{in}$) but reflected across the x-axis ($y_{out}=-y_{in}$), so that it leaves proximate to the second slanted perimeter edge 64. Another illustrative input ray 74 passes through the wedge-shaped notch aperture 66 again proximate to the first slanted perimeter edge 62, but shifted inward horizontally by Δx and at a commensurately lower vertical position (smaller $y_{in}$ coordinate) as enabled by the slant of the first slanted perimeter edge 62. The corresponding exit ray 76 leaves proximate to the second slanted perimeter edge 64 at the same x coordinate as the input ray 74, but again reflected across the x-axis. Thus, the ray running from input 70 to output 72 has a longer delay than the ray running from input 74 to output 76. The slanted perimeter edges 62, 64 of the wedge-shaped notch aperture 66 thus enables the time delay to be adjusted based on the location of the input beam.

In the embodiment of FIGS. 3 and 4, including the single wedge-shaped notch aperture 66, the number of swirls is N+½ and the exit ray leaves the multi-pass optical cell 50 through the same aperture 66 as the input ray entered.

Figure 5:
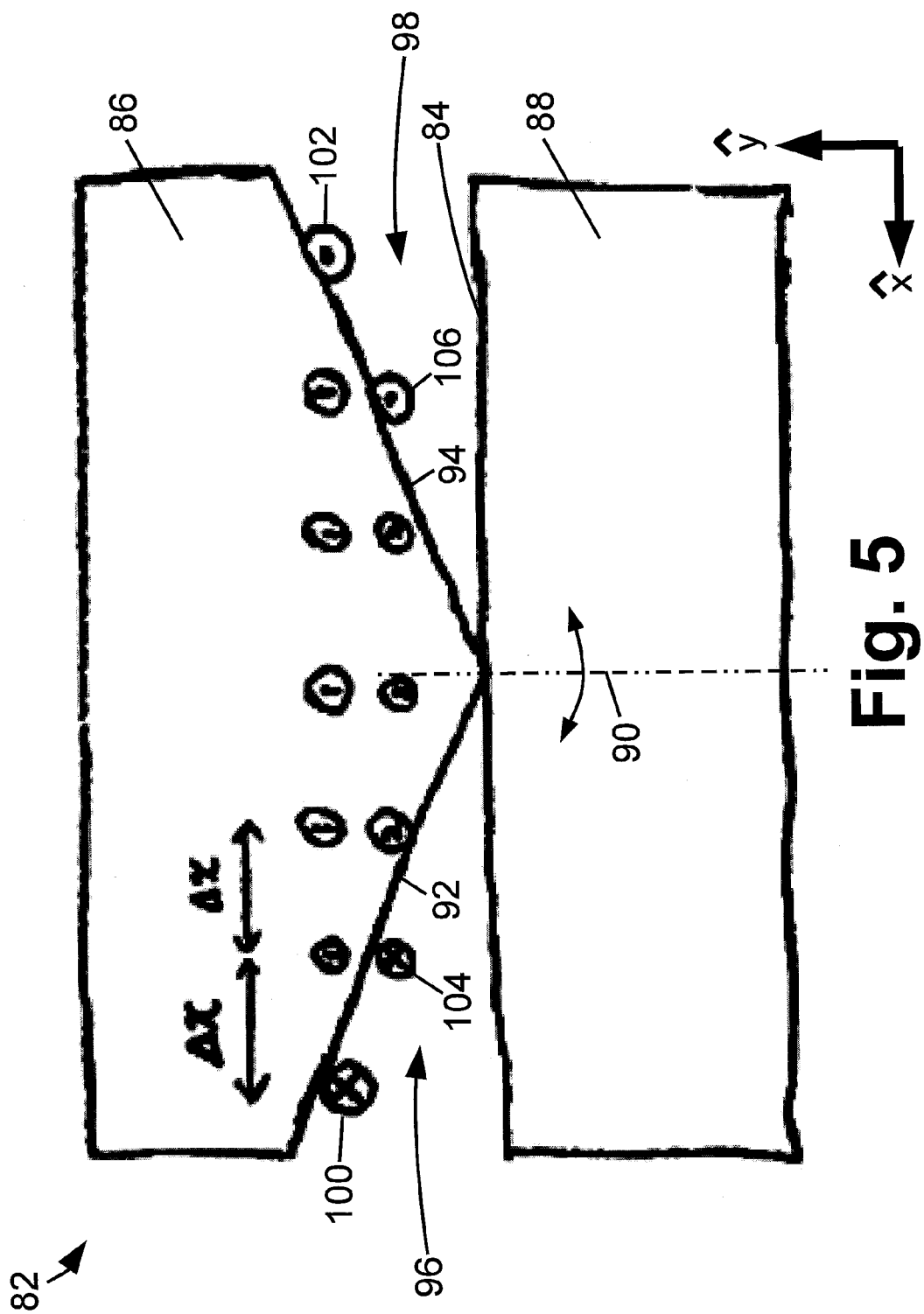
FIG. 5 shows a plan view of another mirror suitably used in a multi-pass optical cell as disclosed herein, which has two wedge-shaped notch apertures for input and output, respectively.

With reference to FIG. 5, in an alternative embodiment the time delay is provided by N swirls, rather than by N+½ swirls as in the embodiment of FIGS. 3 and 4. FIG. 5 illustrates a mirror 82 that is suitably substituted for the mirror 52 in the optical delay cell of FIG. 3. In analogy to the mirror 52, the mirror 82 is split horizontally along a split axis 84 into first and second component mirrors 86, 88. The first component mirror 86 is fixed, while the second component mirror 88 is allowed to tilt with respect to a vertical tilt axis 90. As compared with the mirror 52, the mirror 82 has a different perimeter. The perimeter of the mirror 82 includes a first slanted perimeter edge 92 formed into the first component mirror 86 with the same slant angle as the first slanted perimeter edge 62 of the mirror 52. However, in place of the second slanted perimeter edge 64 formed into the second component mirror 58 of the mirror 52, the mirror 82 instead includes a second slanted perimeter edge 94 formed into the first component mirror 86 that is on the opposite side of the mirror 82 from the first slanted perimeter edge 92. The second perimeter edge 94 is again slanted respective to the split axis 84 and respective to the tilt axis 90. Thus, in the mirror 82 both first and second slanted perimeter edges 92, 94 are formed into the same component mirror 86. As a consequence, the mirror 82 includes two wedge-shaped notches 96, 98 on opposite sides of the mirror 82. The first wedge-shaped notches 96 serves as the input aperture, and hence may be referred to as an input wedge-shaped notch aperture 96. The second wedge-shaped notches 98 serves as the output aperture, and hence may be referred to as an output (or exit) wedge-shaped notch aperture 98. It will also be noticed from FIG. 5 that the input wedge-shaped notch aperture 96 is defined by the first slanted perimeter edge 92, and also by a second perimeter edge that coincides with the split axis 84 and is transverse to the tilt axis 90 (and hence not slanted respective to the tilt axis 90). Similarly, the output wedge-shaped notch aperture 98 is defined by the second slanted perimeter edge 94, and also by a second perimeter edge that again coincides with the split axis 84 and is transverse to the tilt axis 90 (and hence not slanted respective to the tilt axis 90).

To illustrate operation, an input ray 100 passes through the input wedge-shaped notch aperture 96 proximate to the first slanted perimeter edge 92. In accord with Equations (2) and (3) which apply for N swirls, the corresponding exit ray 102 leaves at the same y-coordinate ($y_{out}=y_{in}$ as per Equation (3)) but on the opposite side ($x_{out}=-x_{in}$ as per Equation (2))), so that it leaves through the output wedge-shaped notch aperture 98 proximate to the second slanted perimeter edge 94. Another illustrative input ray 104 passes through the input wedge-shaped notch aperture 96 again proximate to the first slanted perimeter edge 92, but shifted inward horizontally by $\Delta x$ and at a commensurately lower vertical position (smaller $y_{in}$ coordinate) as enabled by the slant of the first slanted perimeter edge 92. The corresponding exit ray 106 leaves through the exit wedge-shaped notch aperture 98 proximate to the second slanted perimeter edge 94 at the same y coordinate as the input ray 104, but again on the opposite side along the x-axis. Thus, the ray running from input 100 to output 102 has a longer delay than the ray running from input 104 to output 106. The slanted perimeter edges 92, 94 of the respective input and output wedge-shaped notch apertures 96, 98 thus enables the time delay to be adjusted based on the location of the input beam.

With the designs of FIGS. 3-5, all intermediate reflections strike the mirrors M1, 52 (or M1, 82 in the alternative embodiment of FIG. 5), and only the input and output locations miss the mirrors due to the wedge-shaped notch apertures 66, 96, 98 and communicate with the space outside the cavity of the optical delay element. In FIGS. 4 and 5, the circled numbers show intermediate reflections of the corresponding input beam after every swirl of action. The input locations of the beams determine the amount of delay: the farther the input from the center, the more the swirls and the longer the delay. Typically, a delay of several meters can be achieved.

In the illustrative embodiments, the mirror 52 or the mirror 82 which is segmented into component mirrors 56, 58 or component mirrors 86, 88 respectively also includes the one or more wedge-shaped notch apertures 66, 96, 98. However, it is alternatively contemplated to incorporate the wedge-shaped notch aperture(s) into the undivided mirror M1.

The perimeter edges 62, 64 are the edges of the mirror 52, and similarly the perimeter edges 92, 94 are edges of the mirror 82. These perimeter edges 62, 64, 92, 94 of the mirror do not necessarily correspond to the edges of the substrate (if any) that supports the mirror. For example, in one suitable construction the mirror 52 of FIG. 4 may comprise a reflective optical coating (e.g. a silver coating, a multi-layer dielectric mirror coating defining a Bragg reflector, or so forth) disposed on a rectangular glass substrate (not shown). In such a construction, the mirror 52 has the perimeter shown in FIG. 4 including the mirror perimeter edges 62, 64, and the wedge-shaped notch aperture 66 of the mirror 52 is spanned by an uncoated (and therefore optically transparent) portion of the rectangular glass substrate that supports the mirror 52. In other embodiments the glass or other transparent substrate supporting the mirror may be cut so that its perimeter matches the perimeter of the mirror 52 including the perimeter edges 62, 64 (which has the advantage of eliminating any optical losses that might be introduced by a glass substrate spanning the aperture 66), or the mirror 52 may be a self-supporting element made of a reflective metal, e.g. aluminum. As another contemplated variant, a rectangular glass substrate could be used which has an uncoated portion spanning the notch aperture 66, and the spanning glass could be chosen to have desirable optical properties such as anti-reflection coatings, wavelength-selective optical filter coating, or so forth.

Figure 6:
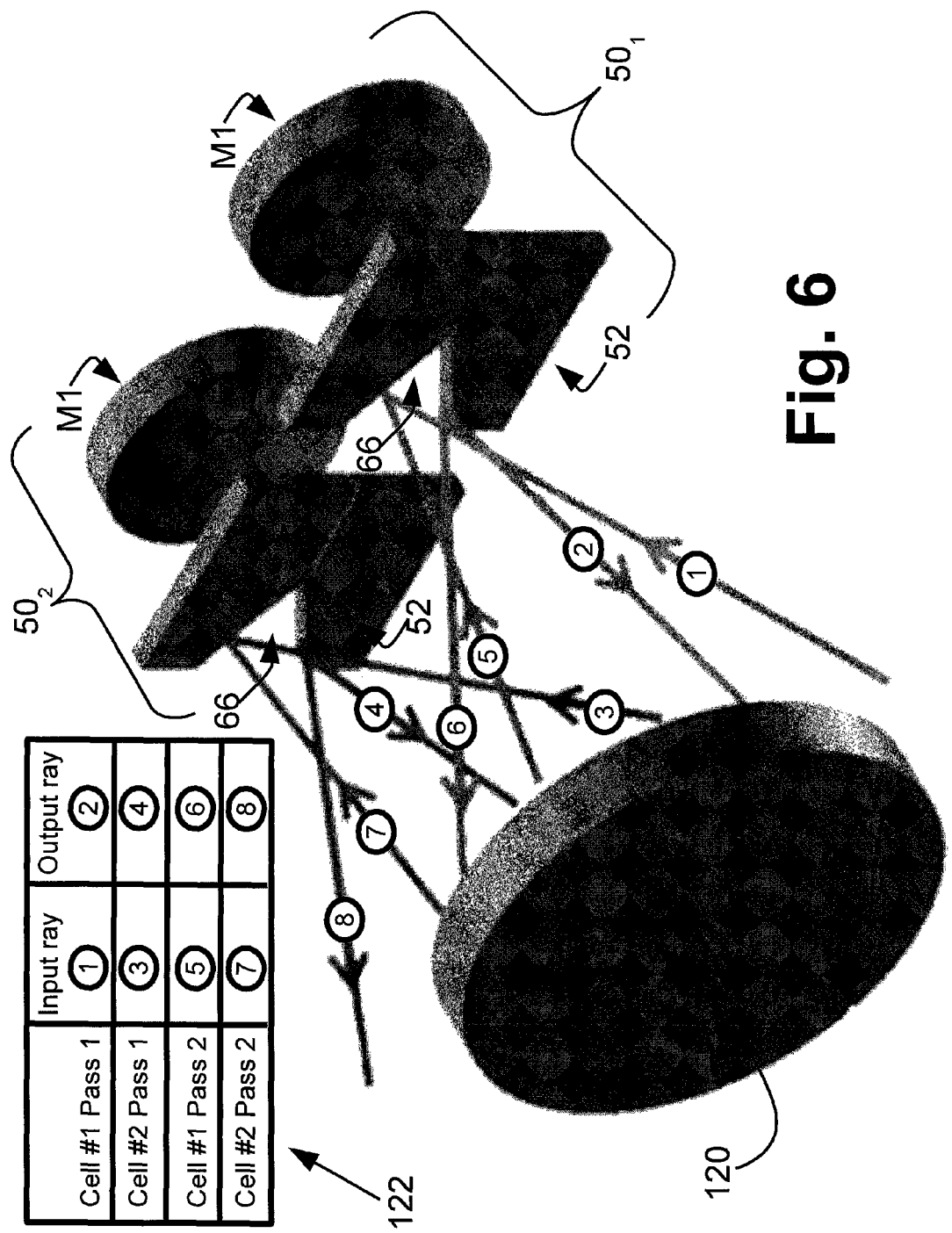
FIG. 6 shows a diagrammatic perspective view of an optical delay element comprising two multi-pass optical cells of the type shown in FIG. 3 optically coupled by a spherical mirror.

With reference to FIG. 6, an approach is disclosed for lengthening the achievable optical delay by way of optically coupled multi-pass optical cells of the type described with reference to FIGS. 3-5. The delay system of FIG. 6 includes two multi-pass multi-mirror optical cells 50₁, 50₂ of the type described with reference to FIGS. 3-4 optically coupled by an additional spherical mirror 120. In the system of FIG. 6, an illustrative ray 1 enters the wedge-shaped notch aperture 66 of the first multi-pass optical cell 50₁ where it circulates over N+½ swirls and exits the same notch aperture 66 as ray 2 which impinges on the spherical mirror 120. The center of the spherical mirror 120 is positioned such that it reflects the output ray 2 of the first multi-pass optical cell 50₁ as reflected ray 3 onto the notch aperture 66 of the second multi-pass optical cell 50₂ on the other side. The light circulates over N+½ swirls in the second multi-pass optical cell 50₂ (it should be noted that the value for N may be different for cell 50₁ versus cell 50₂) and exits as ray 4 which impinges on the spherical mirror 120 and back into the first cell 50₁ as input ray 5. The light again circulates over N+½ swirls in the first multi-pass optical cell 50₁ (although the value of N might be different as compared with the first pass depending upon the detailed construction of the coupling mirror, e.g. spherical mirror 120) and exits as ray 6 which impinges on the spherical mirror 120 and back into the second cell 50₂ as input ray 7, where it again circulates over N+½ swirls in the second multi-pass optical cell 50₂ (where again the value of N might be different as compared with the first pass) and exits as ray 8 which this time misses the spherical mirror 120 and hence is the exit ray from the system. The ray sequence is tabulated in a table 122 also shown in FIG. 6. While four passes are illustrated, in general more or fewer passes may be performed depending on factors such as the size of the coupling spherical mirror 120. In general, the beams bounce back and forth between the constituent cells 50₁, 50₂. Recall that an angular rotation γ is added onto the output beam's slope. Due to this rotation which occurs for every operation inside a constituent multi-pass multi-mirror optical cell, the initial beam will eventually rotate far enough to miss the coupling spherical mirror 120 and come out from the system.

For an input to the system of FIG. 6 consisting of a focused array of beams, the beams at every entrance of each multi-pass optical cell 50₁, 50₂ should be focused. Coincidentally, so long as the cell parameters are adjusted to ensure that the output beams of each multi-pass multi-mirror optical cell are focused, the coupling system of FIG. 6 automatically satisfies the focusing constraint. This is because the focal point of the spherical mirror 120 is aligned such that it lands on the same plane as the input and output beams of the multi-pass multi-mirror optical cell. When the diverging beam comes out of one cell, the coupling spherical mirror 120 refocuses this beam onto the input of the other cell.

Despite their apparent differences, the White cell and the Robert cell are in fact closely related. Their connection was already hinted by noticing the rows of reflection patterns produced inside the Robert cell. Ignoring any intermediate reflections, for every K/2 reflections shown in FIGS. 2-6, the patterns form a straight row that shifts by $\Delta x$ for each swirl. Similarly, the White cell produces spot patterns that advance in a straight line for each cycle of operation.

Furthermore, the relationship between the Robert cell and the White cell extend beyond this observation in that their structures share fundamental similarities. With reference back to FIG. 1, the Robert cell includes two spherical mirrors M1, M2 facing each other. One mirror M2 is split in half into component mirror M2+ and component mirror M2−, and one component mirror M2− is tilted by an angle. This tilt on the component mirror M2− can be equivalently conceived as shifting its center of curvature (CC) such that the CC of tilted component mirror M2− differs from the CC of fixed component mirror M2+. This corresponds to what is done in the White cell, which includes three spherical mirrors, two of which are on the same side and one on the other side. The White cell uses the difference in the CC values of two spherical mirrors on the same side to produce pixelated patterns on the mirror on the opposite side. Under this view, the White cell can be considered to be a special case of the Robert cell, with cell parameters $R_1 = R_2 = d$.

In view of these similarities between a White cell and a Robert cell, it is proposed herein that the Robert cell can be used as a replacement of the White cell. To recover the properties of the White cell, the beams are suitably accessed for every K/2 reflections within the system and all intermediate reflection patterns are ignored. The Robert cell also offers a clear advantage in that it is much smaller than a White cell and could therefore reduce the physical dimensions of White cell based systems.

The properties of the modified Robert cells disclosed herein make them attractive candidates as delay elements for White cell-based optical delay systems. The disclosed wedge-shaped notch apertures 66, 96, 98 allow an array of focused beams to enter the cell through designated input locations, and the beams re-image when they reach their output positions. With optional additional auxiliary spherical mirrors 120 on the output side as described herein with reference to FIG. 6, these output beams can be successfully imaged back into the main White cell system.

A notable advantage of Robert cell based systems is that the cells can create a large time delay in a compact space with low loss. The illustrative examples presented herein show that in a system with mirror separations of order 4 cm, delay on the order of a few meters can be easily achieved (corresponding in time units to a few nanoseconds to a few tens of nanoseconds or longer). In one illustrative example, to obtain a delay of 2.807 meters, the ray encountered 70 reflections. If the device is built with dielectric mirrors that have reflectivity of 0.999, the amount of loss produced by this operation would merely be $0.999^{70} = 0.93 = -0.304$ dB. To create still longer delays, the cell parameters can be varied, or a coupling system as described with reference to FIG. 6 can be adopted. Such coupling systems are enabled by the disclosed wedge-shaped notch apertures 66, 96, 98 which allow an array of focused beams (or, in the case of the coupled system of FIG. 6, successive rays produced by the back-and-forth transfer between the constituent cells 50$_1$, 50$_2$) to enter and exit the respective cells 50$_1$, 50$_2$ through designated input locations within the spatially extended wedge-shaped notch apertures 66, 96, 98.

Furthermore, the modified Robert cells described herein with illustrative reference to FIGS. 3-5 can achieve variable time delays based on the positions at which the ray enters the cell. In particular, different time delays are directly proportional to the ray's discrete input positions. This property makes the disclosed modified Robert cells a suitable candidate for White cell true-time delay systems, whose time delay in each cycle of operations linearly increases with the positions of the beams. The ray positions during each White cell cycle can be calibrated to correspond to each of the modified Robert cell input locations. In the illustrative embodiments, the illustrative wedge-shaped notch apertures 66, 96, 98 provide the spatially extended aperture(s) that enable light rays to enter at different input positions and have different numbers of swirls (and hence different optical time delays) depending upon input location. More generally, any suitable spatially extended aperture can be employed for this purpose. For example, the wedge-shaped notch apertures 66, 96, 98 could be replaced by a spatially extended set of hole apertures corresponding to the different desired optical delay times. The disclosed optical delay elements are usefully utilized in conjunction with applications such as introducing precise and selectable time delays in phased array antennae, providing precise and selectable optical buffering for optical computing or other light processing systems, and so forth.

The preferred embodiments have been described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An optical delay device comprising:
    a multi-pass optical cell including a first curved mirror and a second curved mirror facing the first curved mirror to define an optical cavity;
    wherein the second curved mirror includes a wedge shaped notch aperture formed into the perimeter of the second curved mirror via which an input light beam passes through the second curved mirror, and the multi-pass optical cell is configured to provide a selectable optical time delay based on the location in the wedge shaped notch aperture at which the input light beam passes through the second curved mirror.

2. The optical delay device of claim 1 wherein the first curved mirror is a spherical mirror and the second curved mirror is a spherical mirror.

3. The optical delay device of claim 1 wherein the one of the first curved mirror and the second curved mirror is split to define two component mirrors, one of the two component mirrors is tilted about a tilt axis.

4. The optical delay device of claim 3 wherein the second curved mirror includes said wedge-shaped notch aperture defined at least in part by (i) a first slanted perimeter edge formed into a first component mirror of the two component mirrors that is slanted respective to the tilt axis and (ii) a second slanted perimeter edge formed into a second component mirror of the two component mirrors that is slanted respective to the tilt axis.

5. The optical delay device of claim 4 wherein the first slanted perimeter edge and the second slanted perimeter edge have opposite slant angles.

6. The optical delay device of claim 3 wherein the second curved mirror includes two said wedge-shaped notch apertures comprising (i) an input wedge shaped notch aperture defined at least in part by a first slanted perimeter edge formed into a first component mirror of the two component mirrors that is slanted respective to the tilt axis and (ii) an output wedge-shaped notch aperture defined at least in part by a second slanted perimeter edge formed into the first component mirror that is slanted respective to the tilt axis.

7. The optical delay device of claim 6 wherein the first slanted perimeter edge and the second slanted perimeter edge have opposite slant angles.

8. The optical delay device of claim 1 comprising two said multi-pass optical cells each including one or more said wedge-shaped notch apertures and further comprising:
    a coupling mirror that optically couples the two said multi-pass optical cells via their respective wedge-shaped notch apertures.

9. The optical delay device of claim 8 wherein the first and second curved mirrors of each multi-pass optical cell are spherical mirrors and the coupling mirror is a spherical mirror.

10. An optical delay method comprising:
inputting a light ray into a wedge-shaped notch aperture formed into the perimeter of a second curved mirror of a multi-pass optical cell comprising first and second curved mirrors facing each other to define an optical cavity wherein the light ray passes through the wedge-shaped notch aperture and into the multi-pass optical cell; and
receiving said light ray exiting from the multi-pass optical cell by passing through a wedge shaped notch aperture formed into the perimeter of the second curved mirror of the multi-pass optical cell;
wherein the multi-pass optical cell is configured to provide a selectable optical time delay between the inputting and the receiving based on a location of the inputting.

11. The optical delay method of claim 10 wherein the receiving comprises:
receiving said light ray from the same wedge shaped notch aperture formed into the perimeter of the second curved mirror into which the light ray was inputted.

12. The optical delay method of claim 10 wherein:
the inputting comprises inputting a light ray into a wedge-shaped notch aperture formed into the perimeter of the second curved mirror at a location proximate to a first perimeter edge defining the wedge shaped notch aperture; and
the receiving comprises receiving said light ray from the wedge shaped notch aperture at a location proximate to a second perimeter edge defining the wedge shaped notch aperture wherein the second perimeter edge is slanted respective to the first perimeter edge.

13. The optical delay method of claim 10 wherein:
the inputting comprises inputting a light ray into an input wedge-shaped notch aperture formed into the perimeter of the second curved mirror; and
the receiving comprises receiving said light ray from an output wedge shaped notch aperture formed into the perimeter of a side of the second curved mirror opposite from the input wedge-shaped notch aperture.

14. The optical delay method of claim 13 wherein:
the light ray is input into the input wedge-shaped notch aperture proximate to a first perimeter edge that at least partly defines the input wedge shaped notch aperture; and
the light ray is received from the output wedge shaped notch aperture at a location proximate to a second perimeter edge that at least partly defines the output wedge shaped notch aperture;
wherein the second perimeter edge is slanted respective to the first perimeter edge.

15. The optical delay method of claim 10 wherein the multi-pass optical cell is configured to generate a swirling pattern of reflections on the second curved mirror and the optical delay method further comprises:
selecting a desired optical time delay;
wherein the inputting comprises inputting the light ray into an input location in the wedge-shaped notch aperture that is effective to provide the selected optical time delay between the inputting and the receiving.

16. An optical delay device comprising:
a multi-pass optical cell including a first curved mirror and a second curved mirror facing the first curved mirror to define an optical cavity;
wherein one curved mirror of the multi-pass optical cell includes a wedge-shaped notch aperture formed into a perimeter of the curved mirror; and
wherein one curved mirror of the multi-pass optical cell is split into two component mirrors one of which is tilted to define a swirling reflection pattern on the curved mirror that includes the wedge-shaped notch aperture for a light ray input into the wedge-shaped notch aperture, wherein an optical time delay introduced to the light ray by the multi-pass optical cell depends upon the input location of the light ray into the wedge-shaped notch aperture.

17. The optical delay device of claim 16 wherein the wedge-shaped notch aperture is defined in part by a slanted perimeter edge that is slanted respective to a tilt axis of the component mirror that is tilted, and the optical time delay introduced to a light ray by the multi-pass optical cell depends on where along the slanted perimeter edge the light ray is input into the wedge shaped notch aperture.

18. The optical delay device of claim 16 wherein the same curved mirror of the multi-pass optical cell both includes the wedge-shaped notch aperture and the split into two component mirrors one of which is tilted.

19. The optical delay device of claim 16 wherein the first and second curved mirrors are first and second spherical mirrors.

20. The optical delay device of claim 16 comprising two said multi-pass optical cells and further comprising:
a curved mirror that optically couples the two said multi-pass optical cells.

* * * * *